(12) United States Patent
Ball et al.

(10) Patent No.: US 8,565,177 B2
(45) Date of Patent: Oct. 22, 2013

(54) DYNAMIC LOAD CONTROL FOR DOWNLINK SIGNALING CHANNELS

(75) Inventors: Carsten Ball, München (DE); Robert Muellner, München (DE); Kolio Ivanov, München (DE)

(73) Assignee: Nokia Siemens Networks Oy, Espoo (FI)

( * ) Notice: Subject to any disclaimer, the term of this patent is extended or adjusted under 35 U.S.C. 154(b) by 234 days.

(21) Appl. No.: 13/262,520

(22) PCT Filed: Apr. 3, 2009

(86) PCT No.: PCT/EP2009/054050
§ 371 (c)(1),
(2), (4) Date: Oct. 17, 2011

(87) PCT Pub. No.: WO2010/112085
PCT Pub. Date: Oct. 7, 2010

(65) Prior Publication Data
US 2012/0039170 A1 Feb. 16, 2012

(51) Int. Cl.
*H04W 4/00* (2009.01)
*H04W 28/04* (2009.01)
(52) U.S. Cl.
CPC ...................................... *H04W 28/04* (2013.01)
USPC ......................................................... 370/329
(58) Field of Classification Search
CPC .................................................... H04W 28/04
See application file for complete search history.

(56) References Cited

U.S. PATENT DOCUMENTS

| 8,406,210 B2* | 3/2013 | Kim ............................... 370/345 |
| 2010/0042887 A1* | 2/2010 | Yamada et al. ............... 714/749 |
| 2010/0208667 A1* | 8/2010 | Chun et al. ..................... 370/329 |
| 2010/0227569 A1* | 9/2010 | Bala et al. ......................... 455/73 |
| 2010/0278131 A1* | 11/2010 | Jeong et al. .................... 370/329 |
| 2012/0039295 A1* | 2/2012 | Quan et al. ..................... 370/329 |
| 2012/0250641 A1* | 10/2012 | Sartori et al. ................. 370/329 |
| 2012/0281654 A1* | 11/2012 | Aiba et al. ..................... 370/329 |

OTHER PUBLICATIONS

NTT DoCoMo, Inc., "Summary (with revision marks) of email discussion point 3: Initial Access Procedure: C-RNTI and HARQ," 3GPP TSG RAN WG2 #56bis, Tdoc-R2-070338, Jan. 15-17, 2007, 9 pages.*

(Continued)

*Primary Examiner* — Steven H Nguyen
*Assistant Examiner* — Phuongchau B Nguyen
(74) *Attorney, Agent, or Firm* — Harrington & Smith

(57) ABSTRACT

A number of channel coding elements per transmission time interval required to transmit control information to a communication terminal is evaluated based on communication connection condition information with respect to the communication terminal, wherein the control information is defined by information on the scheduling of communication resources allocation to the communication terminal. A modified capacity is determined, wherein a capacity is defined by a total of available channel coding elements per transmission time interval on a channel dedicated for transmitting the control information. In addition, a quantity of communication terminals is selected for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

26 Claims, 7 Drawing Sheets

(56) References Cited

OTHER PUBLICATIONS

IP Wireless, et al., "RACH access optimisation," 3GPP TSG RAN WG2 #59, R2-073186, Jun. 2007, 6 pages.*
R1-081447, 3GPP TSG RAN WG1 Meeting #52bis, "PDCCH Decoding Complexity and Associated Hashing Functions", Nokia, Nokia Siemens Networks, Mar. 31-Apr. 4, 2008, Shenzhen, China, 4 pgs.

3GPP TS 36.213 V8.6.0 (Mar. 2009), "3$^{rd}$ Generation Partnership Project; Technical Specification Group Radio Access Network; Evolved Universal Terrestrial Radio Access (E-UTRA); Physical layer Procedures (Release 8)", 77 pgs.
3GPP TS 36.211 V8.6.0 (Mar. 2009), 3$^{rd}$ Generation Partnership Project; Technical Specification Group Radio Access Network; Evolved Universal Terrestrial Radio Access (E-UTRA); Physical Channels and Modulation (Release 8): 83 pgs.

* cited by examiner

DYNAMIC LOAD CONTROL FOR DOWNLINK SIGNALING CHANNELS

FIELD OF THE INVENTION

The present invention relates to an apparatus, method, system and computer program product for enhancing a dynamic load control for downlink signaling channels.

RELATED BACKGROUND ART

Prior art which is related to this technical field can e.g. be found by the technical specifications TS 36.213 (current version: 8.6.0) of the 3GPP.

The following meanings for the abbreviations used in this specification apply:
3GPP: Third Generation Partnership Project
AGG: Aggregation Level on PDCCH
AIF: Air Interface
AMC: Adaptive Modulation and Coding
ARQ: Automatic Repeat Request
CCE: Channel Coding Element
CDF: Cumulative Distribution Function
CL: Closed Loop
CQI: Channel Quality Indicator
CSS: Common Search Space
CW: Codeword
DCI: Downlink Control Information
DIV: Diversity
DL: Downlink
DRX: Discontinuous Reception
eNB: Evolved Node B (eNodeB)
EPC: Evolved Packet Core
EPS: Evolved Packet System
E-UTRAN: Evolved UTRAN
LTE: Long Term Evolution
MCS: Modulation and Coding Scheme
MIMO: Multiple-In-Multiple-Out Antenna System
MoRSE: Mobile Radio Simulation Environment
OLLA: Outer Loop Link Adaptation
PC: Power Control
PCFICH: Physical Control Format Indicator Channel
PDCCH: Physical Downlink Control Channel
PDSCH: Physical Downlink Shared Channel
PHICH: Physical Hybrid ARQ Indicator Channel
PUSCH: Physical Uplink Shared Channel
PRB: Physical Resource Block
PSD: Power Spectral Density
OFDM: Orthogonal Frequency Division Multiplex
OL: Open Loop
QAM: Quadrature Amplitude Modulation
QPSK: Quadrature Phase Shift Keying
RACH: Random Access Channel
RAN: Radio Access Network
RNTI: Radio Network Temporary Identifier
RRC: Radio Resource Control (Signaling)
SC-FDMA: Single Carrier Frequency Division Multiple Access
SM: Spatial Multiplexing
SNIR: Signal-to Noise Ratio
TTI: Transmission Time Interval
TU3: Channel Model Typical Urban 3 km/h
UE: User Equipment
UL: Uplink
UMTS: Universal Mobile Telecommunications System
USS: UE Specific Search Space
UTRAN: UMTS Terrestrial Radio Access Network Recently, the 3GPP LTE technology is under study for introduction as successor of 3G UMTS providing wireless broadband access with high capacity, high user data rates and low latency/access times.

According to LTE, PDCCH is the downlink control channel, which carries the information about the structure and allocation of the shared traffic channels in UL and DL (PDSCH, PUSCH), i.e. the PDCCH contains the UL and DL grants for physical resource block (PRB) allocation, modulation and coding scheme (MCS) selection as well as power control commands, current MIMO mode etc. which are to be submitted e.g. by an evolved Node B to scheduled UEs in a certain TTI. In addition, the PDCCH also covers signaling allocation such as e.g. broadcast, paging and random access response messages. Efficient utilization of the PDCCH is the key for good LTE system performance and high capacity.

Specifically, an eNodeB as the LTE base station has to signal on the PDCCH per TTI to all scheduled UEs the corresponding allocation for UL and DL. In addition, also broadcast, paging and other common signaling is transmitted. In order to comply with these tasks, the PDCCH is partitioned into a common search space (CSS) and a UE specific search space (USS). Every active UE in the cell listens to the PDCCH (excluding the configured DRX periods). Though, a UE listens only on specific search positions according to its hashing function, which relies on RNTI and a sub frame number and the aggregation selected for the message. An aggregation defines the code-rate selected for the message, which is derived from CQI/radio quality measurements such that typically a target of 1% BLER (TARGET_BLER) is maintained. Unfortunately, the higher the aggregation, the lower is the number of potential search positions on the PDCCH. There are aggregations AGG1 (QPSK-2/3), AGG2 (QPSK 1/3), AGG4 (QPSK-1/6) and AGG8 (QPSK-1/12) possible with six potential search positions, six potential search positions, two potential search positions, and two potential search positions, respectively, on PDCCH available. Moreover, a high aggregation occupies more capacity on PDCCH, i.e. the terminal might suffer from higher blocking probability due to PDCCH hashing. Furthermore, depending on the message size, every aggregation level has a certain SNIR requirement for achieving the TARGET_BLER, i.e. a large MIMO message (e.g. DCI format 2/2a) requires higher SNIR than a small conventional message (e.g. DCI format 0, 1, 1a, . . . , 1d).

Thus, it is apparent that having several UEs allocated in a cell with different aggregations leads to a high probability that collisions occur, i.e. the colliding UE cannot be served in that particular TTI if the required search position on the PDCCH is already occupied by another UE. Such UEs may be termed as blocked. Moreover, it can happen that already scheduled UEs cannot be served due to collisions which are caused if the scheduler of a eNodeB does not take into account the PDCCH hashing, when selecting the UEs, i.e. the scheduling information for a specific UE is arranged in a search position, which has already been occupied by another UE. This leads to loss on the air interface by unused resources.

PDCCH also supports power control. By means of power relocation from one DCI message to another one a fine tuning of the target BLER can be achieved within certain power ranges of +/−4 to 5 dB as long as the maximum output power constraint of the eNB is maintained.

The total PDCCH capacity in terms of channel coding elements (CCEs) depends on the number of OFDM symbols reserved per TTI. For example, in 10 MHz bandwidth 1, 2 or 3 OFDM symbols can be allocated in a TTI for PDCCH.

SUMMARY OF THE INVENTION

It is thus an object of the present invention to overcome at least some of the shortcomings of the prior art.

According to a first aspect of the present invention, this is accomplished by an apparatus, comprising: an evaluator configured to evaluate a number of channel coding elements per transmission time interval required to transmit control information to a communication terminal, wherein the control information is defined by information on the scheduling of communication resources allocation to the communication terminal, and wherein the evaluator is configured to evaluate the required number of channel coding elements per transmission time interval based on communication connection condition information with respect to the communication terminal; a determining processor configured to determine a modified capacity, wherein a capacity is defined by a total of available channel coding elements per transmission time interval on a channel dedicated for transmitting the control information; and a selector configured to select a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Modifications of the first aspect may be as follows.

The apparatus according to the first aspect may be configured to be suitable for enhancing a dynamic load control for downlink signaling channels.

The determining processor may be further configured to determine the modified capacity by multiplying the capacity by a modifier set in accordance with a configuration on a target blocking value, wherein the target blocking value may be defined by a number of communication terminals which are not provided with control information.

The apparatus may further comprise an observing processor configured to observe a number of communication terminals per transmission time interval which is not provided with control information.

The determining processor may be further configured to determine the modified capacity by multiplying the capacity by a second modifier set in accordance with a configuration on a target load balance between uplink and downlink.

The evaluator may be further configured to set and change a number of channel coding elements per transmission time interval for transmitting control information to a communication terminal by being configured to increase the number and to send a command to decrease transmission power for the control information, and by being configured to decrease the number and to send a command to increase transmission power for the control information.

The determining processor may be further configured to determine the modified capacity by multiplying the capacity by a modifier set in accordance with a configuration on a target blocking value, wherein the target blocking value may be defined by a number of communication terminals which are not provided with control information; the evaluator may be further configured to set the number of channel coding elements per transmission time interval for transmitting control information to a communication terminal such that a particular target blocking value is achieved; and the command to increase transmission power for the control information may be related to a communication terminal for which the set number of channel coding elements per transmission time interval for transmitting control information is lower than the required number of channel coding elements per transmission time interval for transmitting control information as evaluated by the evaluator.

The apparatus may further comprise a capacity controller configured to change the total of available channel coding elements per transmission time interval on the channel dedicated for transmitting the control information in dependency on a target blocking value and/or a ratio of occupied channel coding elements and available channel coding elements.

The determining processor may be further configured to partition the total of available channel coding elements per transmission time interval on the channel dedicated for transmitting the control information into a common part and a user specific part, and to determine the user specific part as the modified capacity.

The apparatus may further comprise a blocking detector configured to detect blocking of communication of a communication terminal of the selected quantity, and to command removal of a communication terminal with detected blocking from the selected quantity.

The determining processor may be further configured to determine an unused capacity as a part of the total of available channel coding elements per transmission time interval on the channel dedicated for transmitting the control information, which is not provided for transmitting control information to a communication terminal due to the removed communication terminal with detected blocking; the determining processor may be further configured to determine unused power corresponding to the unused capacity on the basis of a predefined unit power per channel coding element; and the selector may be further configured to accept a further communication terminal instead of the communication terminal with detected blocking for using the removed resources and/or to command redistributing the unused power to other communication terminals.

The evaluator may be further configured to automatically set a number of channel coding elements per transmission time interval for transmitting control information to a communication terminal lower than the evaluated required number of channel coding elements per transmission time interval and to send a command to increase transmission power for the transmission of control information to the communication terminal; and the selector may be further configured to take the lower number of channel coding elements per transmission time interval for transmitting control information with increased transmission power to the communication terminal as the number of channel coding elements per transmission time interval required to transmit control information to the communication terminal.

According to a second aspect of the present invention, the object is accomplished by an apparatus, comprising: means for evaluating a number of channel coding elements per transmission time interval required to transmit control information to a communication terminal, wherein the control information is defined by information on the scheduling of communication resources allocation to the communication terminal, and for evaluating the required number of channel coding elements per transmission time interval based on communication connection condition information with respect to the communication terminal; means for determining a modified capacity, wherein a capacity is defined by a total of available channel coding elements per transmission time interval on a channel dedicated for transmitting the control information; and means for selecting a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Modifications of the second aspect may correspond to the modifications of the first aspect.

According to a third aspect of the present invention, the above object is accomplished by a method, comprising: evaluating a number of channel coding elements per transmission time interval required to transmit control information to a communication terminal based on communication connection condition information with respect to the communication terminal, wherein the control information is defined by information on the scheduling of communication resources allocation to the communication terminal; determining a modified capacity, wherein a capacity is defined by a total of available channel coding elements per transmission time interval on a channel dedicated for transmitting the control information; and selecting a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Modifications of the third aspect may be as follows.

The method according to the third aspect may be configured to be suitable for enhancing a dynamic load control for downlink signaling channels.

The evaluating may be performed by an evaluator, the determining may be performed by a determining processor, and the selecting may be performed by a selector.

The determining may include determining the modified capacity by multiplying the capacity by a modifier set in accordance with a configuration on a target blocking value, wherein the target blocking value may be defined by a number of communication terminals which are not provided with control information.

The method may further comprise observing a number of communication terminals per transmission time interval which is not provided with control information.

The observing may be performed by an observing processor.

The determining may include determining the modified capacity by multiplying the capacity by a second modifier set in accordance with a configuration on a target load balance between uplink and downlink.

The evaluating may include setting and/or changing a number of channel coding elements per transmission time interval for transmitting control information to a communication terminal by increasing the number and sending a command to decrease transmission power for the control information, and by decreasing the number and sending a command to increase transmission power for the control information.

The determining may further include determining the modified capacity by multiplying the capacity by a modifier set in accordance with a configuration on a target blocking value, wherein the target blocking value may be defined by a number of communication terminals which are not provided with control information; and the evaluating may further include setting the number of channel coding elements per transmission time interval for transmitting control information to a communication terminal such that a particular target blocking value is achieved; and the method may further comprise relating the command to increase transmission power for the control information to a communication terminal for which the set number of channel coding elements per transmission time interval for transmitting control information is lower than the required number of channel coding elements per transmission time interval for transmitting control information.

The relating may be performed by the evaluator.

The method may further comprise changing the total of available channel coding elements per transmission time interval on the channel dedicated for transmitting the control information in dependency on a target blocking value and/or a ratio of occupied channel coding elements and available channel coding elements.

The changing may be performed by a capacity controller.

The method may further comprise partitioning the total of available channel coding elements per transmission time interval on the channel dedicated for transmitting the control information into a common part and a user specific part, and determining the user specific part as the modified capacity.

The portioning and the determining may be performed by the determining processor.

The method may further comprise detecting blocking of communication of a communication terminal of the selected quantity, and commanding removal of a communication terminal with detected blocking from the selected quantity.

The detecting blocking may be performed by a blocking detector.

The method may further comprise determining an unused capacity as a part of the total of available channel coding elements per transmission time interval on the channel dedicated for transmitting the control information, which is not provided for transmitting control information to a communication terminal due to the removed communication terminal with detected blocking; determining unused power corresponding to the unused capacity on the basis of a predefined unit power per channel coding element; and accepting a further communication terminal instead of the communication terminal with detected blocking for using the removed resources and/or commanding redistributing the unused power to other communication terminals.

The determining may respectively be performed by the determining processor, and the accepting may be performed by the selector.

The method may further comprise automatically setting a number of channel coding elements per transmission time interval for transmitting control information to a communication terminal lower than the evaluated required number of channel coding elements per transmission time interval; sending a command to increase transmission power for the transmission of control information to the communication terminal; and taking the lower number of channel coding elements per transmission time interval for transmitting control information with increased transmission power to the communication terminal as the number of channel coding elements per transmission time interval required to transmit control information to the communication terminal.

The automatically setting and the sending a command may be performed by the evaluator, and the taking the lower number may be performed by the selector.

According to a fourth aspect of the present invention, the above object is accomplished by a computer program product comprising computer executable components which perform, when the program is run on a computer: evaluating a number of channel coding elements per transmission time interval required to transmit control information to a communication terminal based on communication connection condition information with respect to the communication terminal, wherein the control information is defined by information on the scheduling of communication resources allocation to the communication terminal; determining a modified capacity, wherein a capacity is defined by a total of available channel coding elements per transmission time interval on a channel dedicated for transmitting the control information; and selecting a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Modifications of the fourth aspect may be as follows.

The computer program product according to the fourth aspect may be configured to be suitable for enhancing a dynamic load control for downlink signaling channels.

The computer program product according to the eighth aspect may be embodied as a computer-readable storage medium.

Otherwise, modifications of the eighth aspect may correspond to the modifications of the third aspect.

It is to be understood that any of the above modifications can be applied singly or in combination to the respective aspects to which they refer, unless they are explicitly stated as excluding alternatives.

BRIEF DESCRIPTION OF THE DRAWINGS

These and other objects, features, details and advantages will become more fully apparent from the following detailed description of the preferred embodiments which is to be taken in conjunction with the appended drawings, in which.

DETAILED DESCRIPTION OF THE PREFERRED EMBODIMENTS

In the following, description will be made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, dynamic load control for downlink signaling channels in a 3GPP LTE network is described. However, it should be appreciated that these exemplary embodiments are not limited for use among this particular type of wireless communication system, and according to further exemplary embodiments, the present invention can be applied also to dynamic load control for downlink signaling channels in other types of fixed or wireless communication systems and access networks such as e.g. to WLAN (wireless local area network) and WIMAX (worldwide interoperability for microwave access) techniques and standards.

Thus, according to certain embodiments of the present invention, an apparatus, method, system and computer program product for enhancing a dynamic load control for downlink signaling channels is provided.

Figure 6:
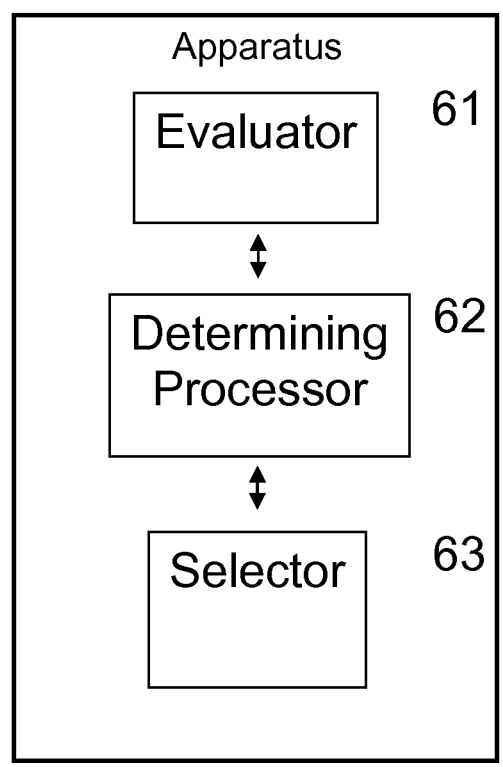
FIG. 6 shows a principle configuration of an apparatus according to certain embodiments of the present invention.

For example, FIG. 6 shows a principle configuration of an apparatus according to certain embodiments of the present invention. That is, as shown in FIG. 6, an apparatus comprises an evaluator 61 configured to evaluate a number of channel coding elements per transmission time interval required to transmit control information to a communication terminal, wherein the control information is defined by information on the scheduling of communication resources allocation to the communication terminal, and wherein the evaluator is configured to evaluate the required number of channel coding elements per transmission time interval based on communication connection condition information with respect to the communication terminal; a determining processor 62 configured to determine a modified capacity, wherein a capacity is defined by a total of available channel coding elements per transmission time interval on a channel dedicated for transmitting the control information; and a selector 63 configured to select a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Figure 7:
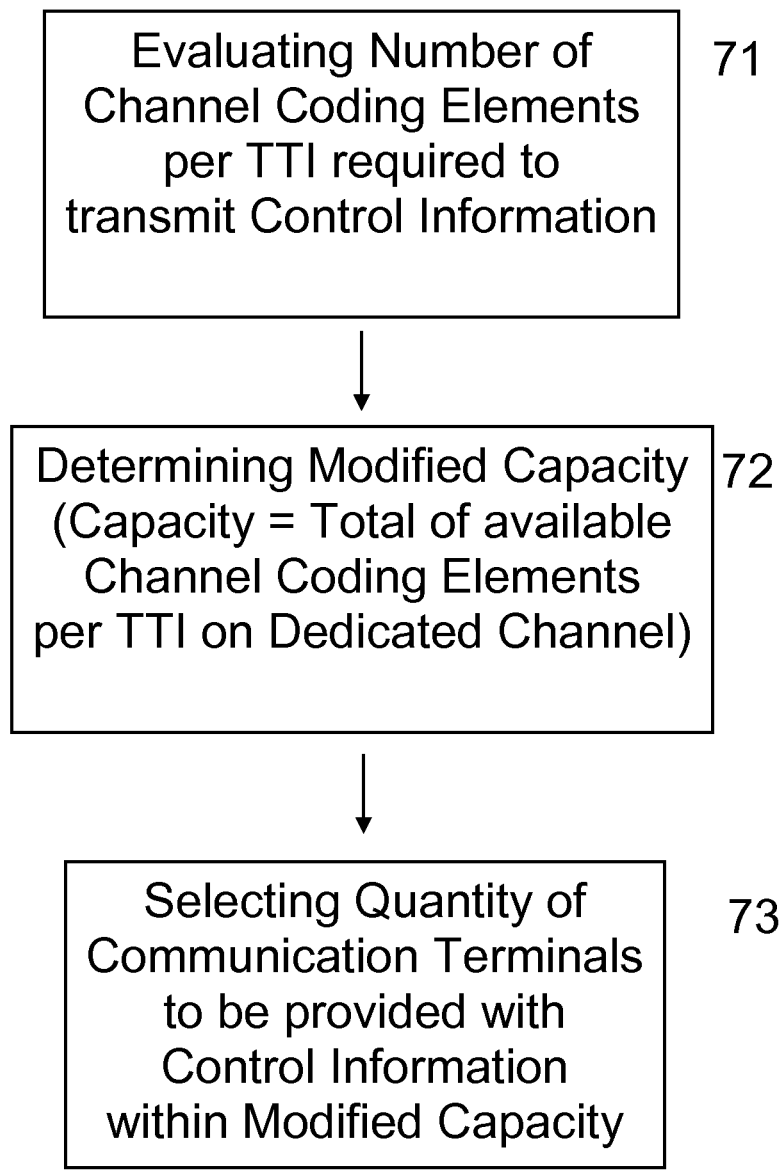
FIG. 7 shows a principle flowchart of a method according to certain embodiments of the present invention.

FIG. 7 shows a principle flowchart of a method according to certain embodiments of the present invention. Specifically, as shown in FIG. 7, a method comprises evaluating 71 a number of channel coding elements per transmission time interval required to transmit control information to a communication terminal based on communication connection condition information with respect to the communication terminal, wherein the control information is defined by information on the scheduling of communication resources allocation to the communication terminal; determining 72 a modified capacity, wherein a capacity is defined by a total of available channel coding elements per transmission time interval on a channel dedicated for transmitting the control information; and selecting 73 a quantity of communication terminals for being provided with control information on the channel dedicated for transmitting the control information by accepting a further communication terminal to the quantity if the total sum of channel coding elements per transmission time interval required to transmit control information to each commumunication terminal does not exceed the modified capacity, and by otherwise rejecting the further communication terminal.

The evaluating 71 can be performed by an evaluator 61 according to FIG. 6, the determining 72 can be performed by a determining processor 62 according to FIG. 6, and the selecting 73 can be performed by a selector 63 according to FIG. 6.

According to certain embodiments of the present invention, an algorithm is provided which dynamically controls the PDCCH capacity per TTI as well as the number of selected UEs balanced for UL and DL direction depending on the network load. Moreover, the algorithm can take into account the UE specific hashing function, the PDCCH blocking and PDCCH utilization, the required aggregation of UEs according to their CQI reports, and the power control, thus optimizing the overall capacity.

Let the total PDCCH capacity of a TTI in terms of CCEs be designated as "C". The capacity C can e.g. be defined by the number of OFDM symbols N_OFDM given for PDCCH in a certain TTI minus PCFICH and PHICH resources. In a first step, "C" covers both CSS and USS resources, in a later more precise step the pre-calculated CSS resources (CSS_CAP) can be subtracted resulting in a modified capacity C'= C−CSS_CAP.

It is to be noted here that the term "modified" capacity is not to be understood as limiting the manner of modifying, but generally refers to a modification which is specified according to the present description of preferred embodiments.

The selection of UEs for being scheduled in a certain TTI can be controlled by the UL and DL scheduler, respectively, as follows, where certain features are described which either when taken alone or in any combination form certain embodiments of the present invention, taking into account one or more of the system load, the PDCCH utilization and the power control headroom on the PDCCH (which is not to be confused with the power headroom coming from UE):

The maximum allowed number of UEs scheduled in UL and DL, respectively, can be limited by configurable parameters "maximum #UEs_DL" and "maximum #UEs_UL". Those limits represent processing power limits of the hardware and/or software, e.g. of a related eNodeB.

Every UE can be imparted a certain required aggregation due to its radio conditions. The required aggregation depends on the submitted CQI report (e.g. a wideband-CQI including averaging filter, OLLA as well as configurable CQI-shift operator). The required aggregation can be selected such that for a given DCI format a certain air interface BLER of 1% is guaranteed, which can be derived from certain CQI thresholds, which in turn can be derived from link level simulations.

Figure 1A:
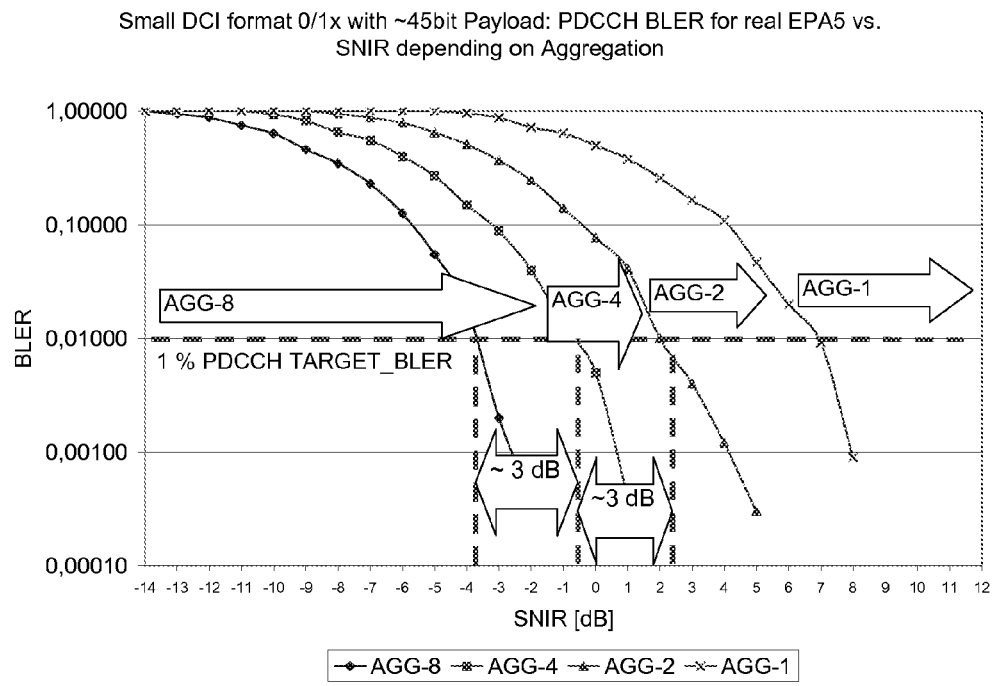
FIGS. 1a and 1b show the PDCCH BLER for ideal TU3 channel model versus the SNIR depending on aggregation for DCI messages with small payload (DCI 0/1x with ~45 bit) and large payload (DCI 2/2a with ~60 bit), respectively.
Figure 1B:
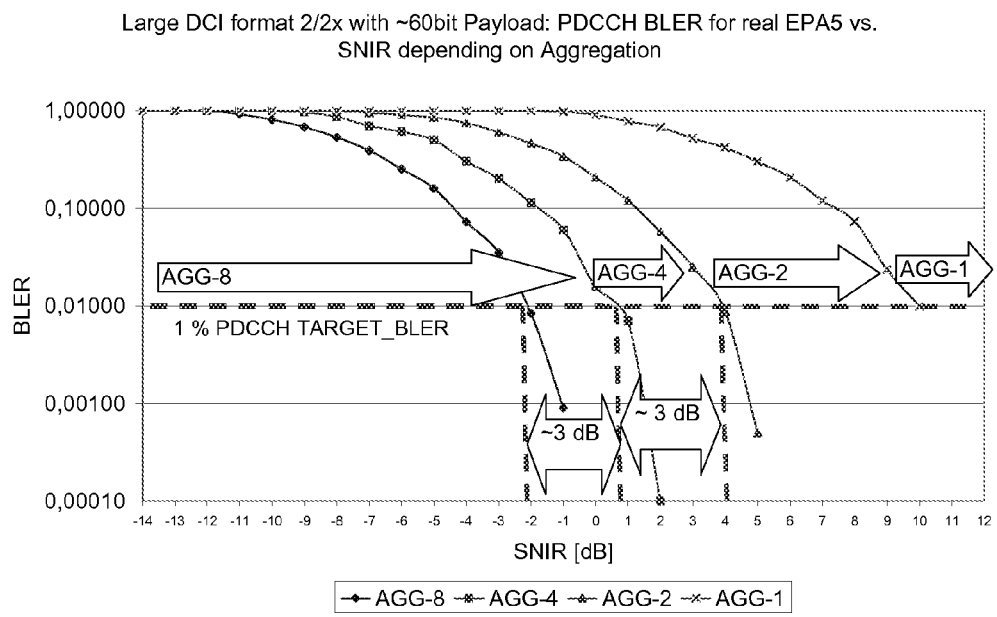

For illustrative purposes, FIGS. 1a and 1b show for a small 45 bit and a larger 60 bit DCI message, respectively, the PDCCH BLER for ideal TU3 versus the SNIR depending on aggregation. The selected aggregation for a certain SNIR maintaining <1% target BLER is represented by an arrow.

For example, it can be guaranteed that the sum of the aggregations of all selected UEs per TTI is less than a parameter ALPHA multiplied by C (ALPHA*C). The parameter ALPHA is an eNB internal parameter which is configurable and adaptive and thus modifies the capacity C as a modifier. With ALPHA<1 the PDCCH is only fractionally loaded thus reducing the blocking probability due to PDCCH hashing. With ALPHA>1 there is some over-provisioning, however, apparently on expense of significantly increased blocking.

Example 1

C=40 CCEs.
With ALPHA=0.8 the schedulers are only allowed to select UEs requiring a total capacity of 0.8*40=32 CCEs.
For Instance:

| | |
|---|---|
| UE1 with AGG8 | SUM_AGG = 8 |
| + UE2 AGG4 | SUM_AGG = 12 |
| + UE3 AGG8 | SUM_AGG = 20 |
| + UE4 AGG4 | SUM_AGG = 24 |
| + UE5 AGG4 | SUM_AGG = 28 |
| Skip (+UE6 AGG8 | SUM_AGG = 36 > 32) |
| + UE7 AGG2 | SUM_AGG = 30 |
| Skip (+UE8 AGG4 | SUM_AGG = 34 > 32) |
| + UE8 AGG2 | SUM_AGG = 32 |

Skip all other UEs due to exhausted capacity.

It is to be noted that this selection does not consider that selected UEs might be finally blocked due to collisions caused by the hashing function. Nevertheless, it is guaranteed that the higher ALPHA the higher the blocking.

UL and DL can be balanced by a ratio parameter "UL_DL_BALANCE", i.e. the UL capacity is given by ALPHA*C*UL_DL_BALANCE whereas the DL capacity is given by ALPHA*C*(1-UL_DL_BALANCE).

Example 2

C=40 CCEs, ALPHA=0.8 and UL_DL_BALANCE=0.5.
In this case UL UEs with a summed aggregation of 16 CCEs can be selected and the same can be done for DL UEs. Thus, it is guaranteed that both UL and DL is served per TTI.

The modifier ALPHA can be an adaptive parameter depending on the system load. The blocking shall be measured on a TTI basis and filtered. An acceptable target blocking value (parameter: "TARGET_BLOCKING") shall be defined as upper threshold. In case of increased blocking ALPHA can be decreased and in case of decreased blocking ALPHA can be increased. Here, also the number of finally scheduled UEs (after FD-scheduling) can be taken into account, i.e. if the scheduler skips a certain number of initially selected UEs due to inferior metric during mapping on the frequency domain, ALPHA can be increased to provide some over provisioning and to maintain a sufficiently high number of UEs being scheduled per TTI. This is essential to achieve sufficient frequency and multiuser diversity gain.

The ratio parameter UL_DL_BALANCE can also be an adaptive parameter. In case of underload in either UL or DL direction the parameter will be changed towards the direction requiring more capacity.

Figure 2:
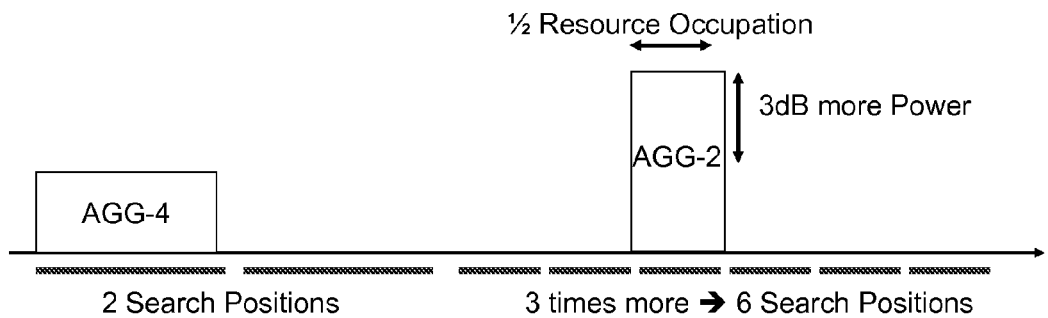
FIG. 2 shows a power and aggregation variation per UE on the PDCCH according to certain embodiments of the present invention.

The PDCCH scheduling can allow the change of aggregations per UE to achieve a successful placement of a UE on the PDCCH without blocking. In case of collision, first a higher aggregation can be tried, and if this step is not successful, also lower aggregations can be performed. It is to be noted that this step increases the air interface BLER above the typical target of 1% BLER for this UE. Hence, a power control function can increase the transmission power for such a UE. It is to be noted that according to the above, link level aggregation 4 and link level aggregation 2 have the same 1% BLER with a difference of roughly 3 to 4 dB. For example, reference is made to FIG. 1b showing −2 dB vs. +1 dB for DCI format 2/2a with ~60 bit payload for AGG-8 and AGG-4. Under the assumption that power for a UE on PDCCH can be increased by up to 4 dB and assuming further on that a 3 dB power increase can be obtained alone from having only one half of the message size and one half of the resources unused, the benefit originates from having more potential search positions on PDCCH as well as occupying less PDCCH search positions for other UEs, as is illustrated by FIG. 2.

Hence, it is very beneficial to allow the automatic usage of lower aggregations than required due to radio conditions, since blocking can be considerably reduced. Nevertheless, there must be sufficient power headroom available for compensation of lower aggregations by means of Power Control. It is to be noted that selection of lower aggregations AGG-4 instead of AGG-8 and AGG-2 instead of AGG-4 are easily feasible according to link level results in FIGS. 1a and 1b. Selection of AGG-1 instead of AGG-2 might not be beneficial, if power boosting is reasonably limited to e.g. 4 dB, since the gap between AGG-1 and AGG-2 in terms of SINR might be significantly higher.

The power control function can calculate the power headroom available per TTI. The headroom is given by two components:

1) The sum over all UEs accumulating the difference between SNIR target for the required aggregation level and the measured SNIR scaled by the aggregation level. The power for the corresponding UEs can be reduced by its individual excess power such that exactly 1% target BLER is obtained.

Figure 3:
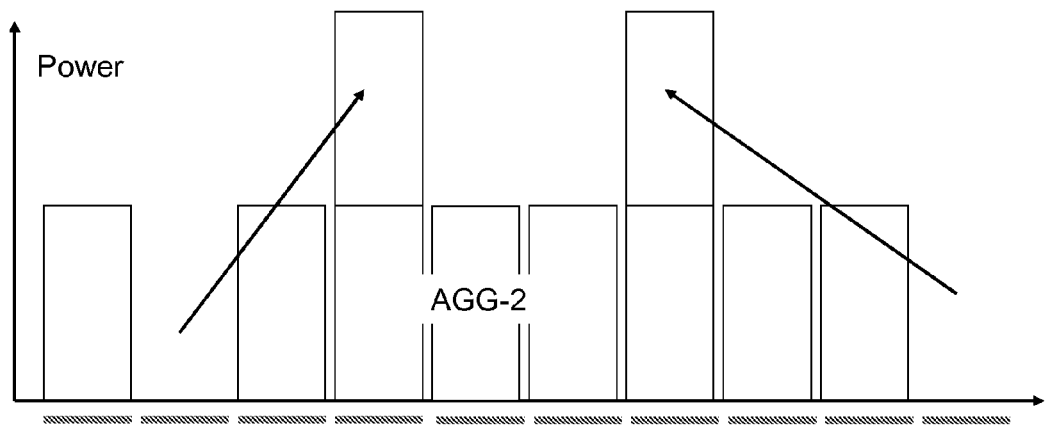
FIG. 3 shows the power headroom exploitation in dependency on the used PDCCH capacity according to certain embodiments of the present invention.

2) The ratio of the unused PDCCH capacity and the occupied PDCCH capacity. It is to be noted that ALPHA<1 always results in unused PDCCH capacity, whose power can be concentrated on the UEs with lower assigned aggregation level than required by the corresponding CQI report. Thus, setting ALPHA less than one allows for reduced blocking due to hashing function collisions, and simultaneously enough power headroom is available to power boost critical UEs. This is illustrated in FIG. 3.

The power headroom can be distributed among the UEs with lower aggregation than required. If the power headroom is sufficient, then ALPHA can be increased. If the power headroom is insufficient then ALPHA can be decreased to avoid a too high BLER (the above described TARGET_BLER).

An outer loop link adaptation counting in addition the PDCCH BLER can be used to control ALPHA.

The number of OFDM symbols "N_OFDM" reserved per TTI for the PDCCH can be dynamically adapted due to network Load. If the ratio between the occupied CCEs and the available CCEs falls below a certain threshold and the blocking is acceptable, then the capacity C can be reduced for example by reducing the PDCCH symbols by one. Vice versa, if the PDCCH utilization is above a certain threshold or the blocking is too high, then the PDCCH capacity can be increased for example by adding another ODFM symbol. This control loop can be based on filtered measurements, e.g. such as PDCCH utilization.

The required capacity on PDCCH per TTI can also be determined by more complex or combined criteria such as the number of scheduled users and their radio conditions/aggregation levels, wherein also blocking and TARGET_BLOCKING can be taken into account. Depending on certain thresholds including hysteresis, N_OFDM can be increased by one or decreased by one. In case of increased blocking (i.e. TARGET_BLOCKING is exceeded) on PDCCH, the N_OFDM can be immediately increased.

The blocked resources on PDCCH can be released, while not being transmitted over the air interface. This is beneficial to save transmit power and to reduce interference in the network or to relocate the saved transmit power. It can be preferred to release the resource and use them for other UEs.

Common signaling like broadcast, paging and RACH response can be assigned to the common search space before the above process. Those shall have a fixed configurable aggregation level. Different messages on the CSS can have different priorities such that they can compete for the limited CSS resources, while the non served messages can be postponed to the next TTI.

Figure 4:
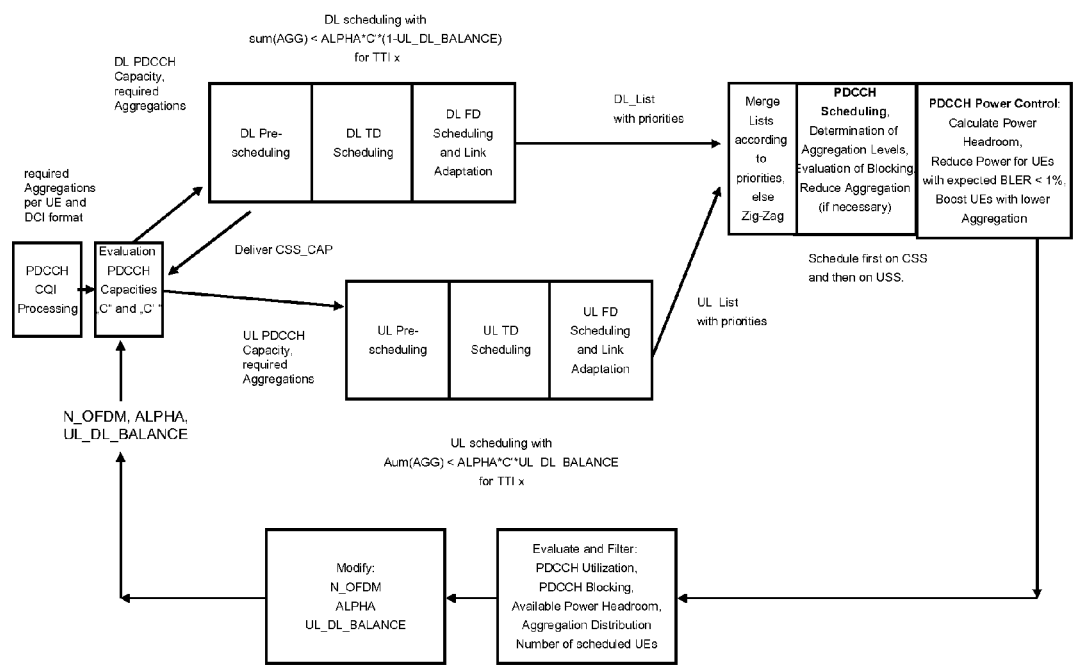
FIG. 4 shows a PDCCH control strategy comprising a closed control loop by taking into account some features of certain embodiments of the present invention.

Since common signaling has high priority compared to user data, it is advantageous that a scheduler first allocates and reserves the CSS relevant messages, which could then be subtracted from the available PDCCH capacity "C" resulting in C'=C−CSS_CAP (see FIG. 4). UL and DL scheduler then select UEs on USS up to ALPHA*C' again split according to UL_DL_BALANCE.

FIG. 4 summarizes a PDCCH strategy by taking into account some of the above described features. Certain embodiments of the present invention can be obtained by selecting one or more or all of the depicted features. FIG. 4 should thus be understood as showing both processes performed in and elements configured for such processes as comprised in a related product.

Specifically, FIG. 4 shows the overall control loop for setting the basic control Parameters N_OFDM (Capacity C), ALPHA and UL_DL_BALANCE; the required aggregations for DCI formats per UE fed in by CQI processing; the UL and DL scheduling procedures taking into account the UL_DL_BALANCE and ALPHA*Capacity; the PDCCH scheduling calculating the hashing functions, assigning the aggregations to the UEs also using lower aggregation than required to reduce blocking and placing the messages to the CCEs on the PDCCH search spaces; the power control calculating the power headroom (mainly coming from ALPHA<1 as well as UEs having expected BLER<1%) and redistributing the power to the critical UEs, i.e. the UEs with an assigned aggregation less than the required aggregation; an evaluation of the overall system performance and especially PDCCH performance (utilization, blocking, aggregation levels, number of scheduled UL/DL UEs . . . , number of active UEs, . . . etc.) and filtering; and a modification of the basic control parameters, if necessary.

FIGS. 5a to 5d show simulation results on PDCCH strategies formed according to certain embodiments of the present invention.

Figure 5A:
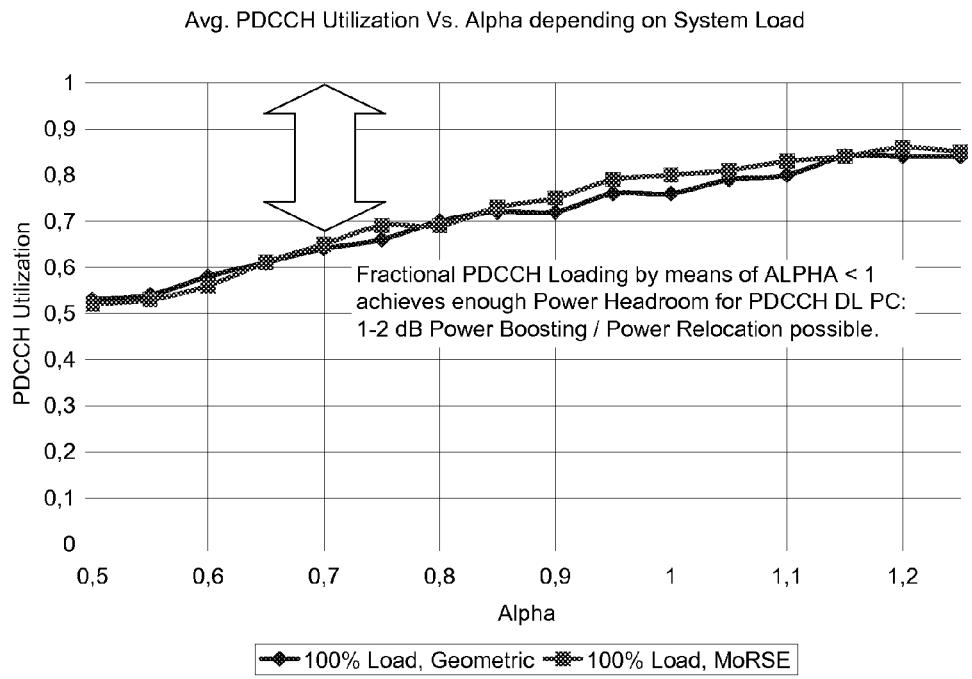
FIGS. 5a to 5d show simulation results on PDCCH strategies formed according to certain embodiments of the present invention.

Specifically, FIG. 5a shows that the PDCCH is only fractionally loaded if ALPHA is less than 1. This gives enough power headroom for power reallocation onto the total allocated PDCCH (in this case 1-2 dB) or very selectively on critical UEs with up to 4 dB per UE. That is, approximately one half of the UEs can be boosted by 4 dB.

Figure 5B:
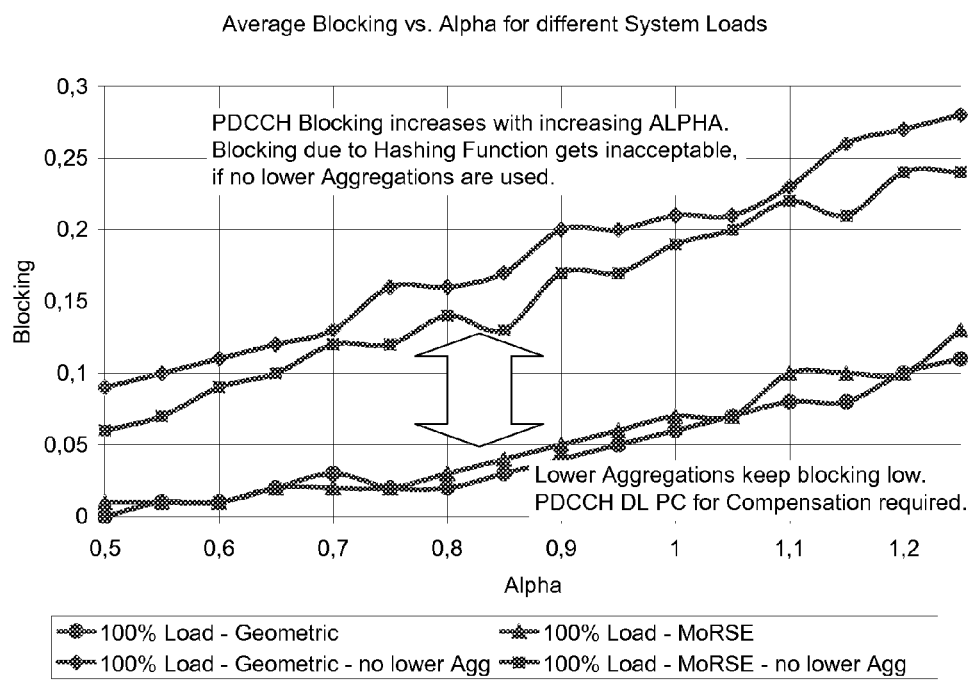

FIG. 5b illustrates that blocking increases with increasing ALPHA. Typically, 15-20% blocking appears for 0.8<ALPHA<1.0. To keep blocking low with an acceptable level <<5%, UEs have to get a lower aggregation than required according to the CQI reports.

Figure 5C:
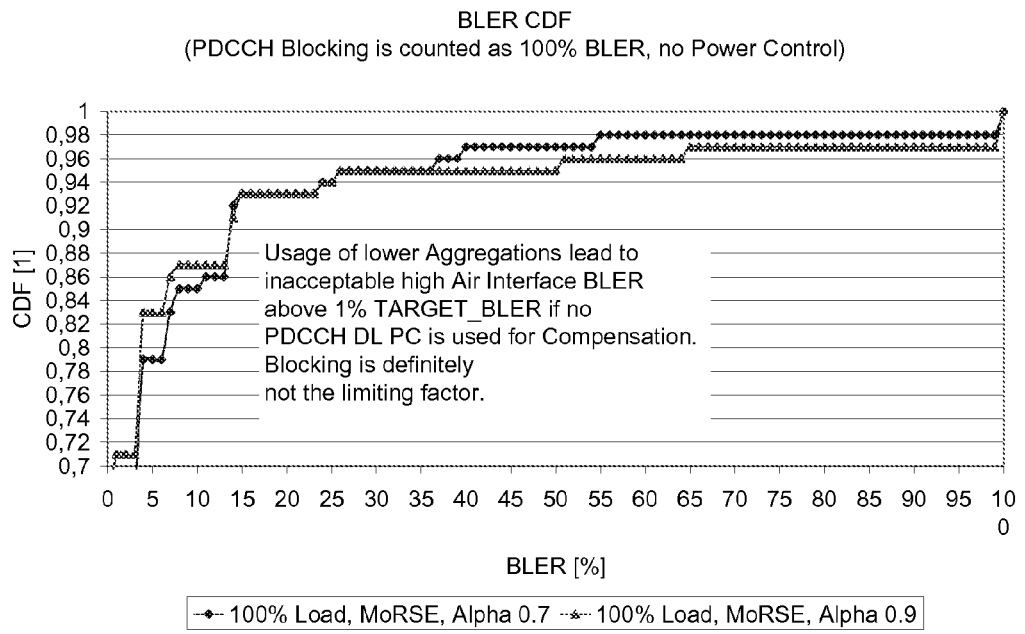

FIG. 5c shows a BLER that is significantly higher than expected (>TARGET_BLER of 1%), since UEs get lower aggregation than required. It is to be noted that FIG. 5c includes both blocking and air interface BLER.

Figure 5D:
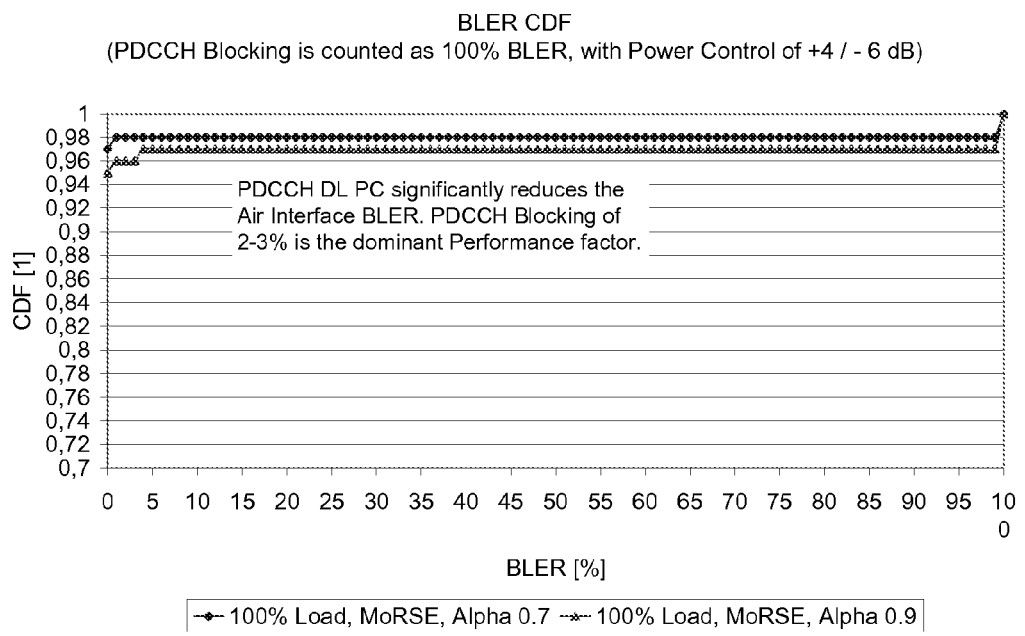

FIG. 5d shows that the power redistribution/reallocation from unused PDCCH area (due to ALPHA<1) to the UEs with expected high BLER keeps the overall blocking and BLER in an acceptable region.

As described above, according to certain embodiments of the present invention, it can be possible that in a UE, a comparison of a CQI report and the assigned aggregation level on PDCCH can show e.g. that a lower or higher aggregation than required is assigned.

Further, according to certain embodiments of the present invention, implementation examples are related to LTE eNB, but are not limited thereto.

Advantages of certain embodiments of the present invention include that standard changes are not required, a capacity increase of a related product such as an eNB can be observed, and that an overload control avoiding loss on air interface resources can be achieved.

According to the above description, it should thus be apparent that exemplary embodiments of the present invention provide, for example from the perspective of a network element such as an evolved Node B (eNB), or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products capable of providing dynamic load control for downlink signaling channels.

Specifically, a number of channel coding elements per transmission time interval required to transmit control information to a communication terminal is evaluated based on communication connection condition information with respect to the communication terminal, wherein the control information is defined by information on the scheduling of communication resources allocation to the communication terminal. A modified capacity is determined, wherein a capacity is defined by a total of available channel coding elements per transmission time interval on a channel dedicated for transmitting the control information. In addition, a quantity of communication terminals is selected for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

Implementations of any of the above described blocks, apparatuses, systems, techniques or methods include, as non limiting examples, implementations as hardware, software, for example in connection with a digital signal processor, firmware, special purpose circuits or logic, general purpose hardware or controller or other computing devices, or some combination thereof.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
   an evaluator configured to evaluate a number of channel coding elements per transmission time interval required to transmit control information to a communication terminal, wherein the control information is defined by information on the scheduling of communication resources allocation to the communication terminal, and wherein the evaluator is configured to evaluate the required number of channel coding elements per transmission time interval based on communication connection condition information with respect to the communication terminal;
   a determining processor configured to determine a modified capacity, wherein a capacity is defined by a total of available channel coding elements per transmission time interval on a channel dedicated for transmitting the control information; and
   a selector configured to select a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

2. The apparatus according to claim 1, wherein the determining processor is further configured to determine the modified capacity by multiplying the capacity by a modifier set in accordance with a configuration on a target blocking value, wherein the target blocking value is defined by a number of communication terminals which are not provided with control information.

3. The apparatus according to claim 2, further comprising: an observing processor configured to observe a number of communication terminals per transmission time interval which are not provided with control information.

4. The apparatus according to claim 1, wherein the determining processor is further configured to determine the modified capacity by multiplying the capacity by a second modifier set in accordance with a configuration on a target load balance between uplink and downlink.

5. The apparatus according to claim 1, wherein the evaluator is further configured to set and change a number of channel coding elements per transmission time interval for transmitting control information to a communication terminal by being configured to increase the number and to send a command to decrease transmission power for the control information, and by being configured to decrease the number and to send a command to increase transmission power for the control information.

6. The apparatus according to claim 5, wherein
   the determining processor is further configured to determine the modified capacity by multiplying the capacity by a modifier set in accordance with a configuration on a target blocking value, wherein the target blocking value is defined by a number of communication terminals which are not provided with control information;
   the evaluator is further configured to set the number of channel coding elements per transmission time interval for transmitting control information to a communication terminal such that a particular target blocking value is achieved; and
   the command to increase transmission power for the control information is related to a communication terminal for which the set number of channel coding elements per transmission time interval for transmitting control information is lower than the required number of channel coding elements per transmission time interval for transmitting control information as evaluated by the evaluator.

7. The apparatus according to claim 1, further comprising: a capacity controller configured to change the total of available channel coding elements per transmission time interval on the channel dedicated for transmitting the control information in dependency on a target blocking value and/or a ratio of occupied channel coding elements and available channel coding elements.

8. The apparatus according to claim 1, wherein the determining processor is further configured to partition the total of available channel coding elements per transmission time interval on the channel dedicated for transmitting the control information into a common part and a user specific part, and to determine the user specific part as the modified capacity.

9. The apparatus according to claim 1, further comprising:
a blocking detector configured to detect blocking of communication of a communication terminal of the selected quantity, and to command removal of a communication terminal with detected blocking from the selected quantity.

10. The apparatus according to claim 2, wherein
the determining processor is further configured to determine an unused capacity as a part of the total of available channel coding elements per transmission time interval on a channel dedicated for transmitting the control information, which is not provided for transmitting control information to a communication terminal due to a modifier set smaller than one;
the determining processor is further configured to determine unused power corresponding to the unused capacity on the basis of a predefined unit power per channel coding element; and
the selector is further configured to accept a further communication terminal to the quantity, although the total sum of channel coding elements per transmission time interval required to transmit control information to each communication terminal of the quantity including the further communication terminal would exceed the modified capacity, by allocating a number of channel coding elements to the further communication terminal which is lower than its required number of channel coding elements per transmission time interval based on its communication connection condition information such that the total sum does not exceed the modified capacity; further comprising:
a power controller configured to allocate a part of the unused power to the further communication terminal so that a transmission power per channel coding element for the further communication terminal is higher than the predefined unit power per channel coding element.

11. The apparatus according to claim 9, wherein
the determining processor is further configured to determine an unused capacity as a part of the total of available channel coding elements per transmission time interval on the channel dedicated for transmitting the control information, which is not provided for transmitting control information to a communication terminal due to the removed communication terminal with detected blocking;
the determining processor is further configured to determine unused power corresponding to the unused capacity on the basis of a predefined unit power per channel coding element; and
the selector is further configured to accept a further communication terminal instead of the communication terminal with detected blocking for using the removed resources and/or to command redistributing the unused power to other communication terminals.

12. The apparatus according to claim 1, wherein
the evaluator is further configured to automatically set a number of channel coding elements per transmission time interval for transmitting control information to a communication terminal lower than the evaluated required number of channel coding elements per transmission time interval and to send a command to increase transmission power for the transmission of control information to the communication terminal; and
the selector is further configured to take the lower number of channel coding elements per transmission time interval for transmitting control information with increased transmission power to the communication terminal as the number of channel coding elements per transmission time interval required to transmit control information to the communication terminal.

13. A method, comprising:
evaluating a number of channel coding elements per transmission time interval required to transmit control information to a communication terminal based on communication connection condition information with respect to the communication terminal, wherein the control information is defined by information on the scheduling of communication resources allocation to the communication terminal;
determining a modified capacity, wherein a capacity is defined by a total of available channel coding elements per transmission time interval on a channel dedicated for transmitting the control information; and
selecting a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

14. The method according to claim 13, wherein the determining includes determining the modified capacity by multiplying the capacity by a modifier set in accordance with a configuration on a target blocking value, wherein the target blocking value is defined by a number of communication terminals which are not provided with control information.

15. The method according to claim 14, further comprising: observing a number of communication terminals per transmission time interval which are not provided with control information.

16. The method according to claim 13, wherein the determining includes determining the modified capacity by multiplying the capacity by a second modifier set in accordance with a configuration on a target load balance between uplink and downlink.

17. The method according to claim 13, wherein evaluating includes setting and/or changing a number of channel coding elements per transmission time interval for transmitting control information to a communication terminal by increasing the number and sending a command to decrease transmission power for the control information, and by decreasing the number and sending a command to increase transmission power for the control information.

18. The method according to claim 17, wherein
the determining further includes determining the modified capacity by multiplying the capacity by a modifier set in accordance with a configuration on a target blocking value, wherein the target blocking value is defined by a number of communication terminals which are not provided with control information; and the evaluating further includes setting the number of channel coding elements per transmission time interval for transmitting control information to a communication terminal such that a particular target blocking value is achieved; and the method further comprises
relating the command to increase transmission power for the control information to a communication terminal for which the set number of channel coding elements per transmission time interval for transmitting control information is lower than the required number of channel coding elements per transmission time interval for transmitting control information.

19. The method according to claim 13, further comprising:
changing the total of available channel coding elements per transmission time interval on the channel dedicated for transmitting the control information in dependency on a target blocking value and/or a ratio of occupied channel coding elements and available channel coding elements.

20. The method according to claim 13, further comprising:
partitioning the total of available channel coding elements per transmission time interval on the channel dedicated for transmitting the control information into a common part and a user specific part, and determining the user specific part as the modified capacity.

21. The method according to claim 13, further comprising:
detecting blocking of communication of a communication terminal of the selected quantity, and
commanding removal of a communication terminal with detected blocking from the selected quantity.

22. The method according to claim 14, further comprising:
determining an unused capacity as a part of the total of available channel coding elements per transmission time interval on a channel dedicated for transmitting the control information, which is not provided for transmitting control information to a communication terminal due to a modifier set smaller than one;
determining unused power corresponding to the unused capacity on the basis of a predefined unit power per channel coding element;
accepting a further communication terminal to the quantity, although the total sum of channel coding elements per transmission time interval required to transmit control information to each communication terminal of the quantity including the further communication terminal would exceed the modified capacity, by allocating a number of channel coding elements to the further communication terminal which is lower than its required number of channel coding elements per transmission time interval based on its communication connection condition information such that the total sum does not exceed the modified capacity; and
allocating a part of the unused power to the further communication terminal so that a transmission power per channel coding element for the further communication terminal is higher than the predefined unit power per channel coding element.

23. The method according to claim 21, further comprising:
determining an unused capacity as a part of the total of available channel coding elements per transmission time interval on the channel dedicated for transmitting the control information, which is not provided for transmitting control information to a communication terminal due to the removed communication terminal with detected blocking;
determining unused power corresponding to the unused capacity on the basis of a predefined unit power per channel coding element; and
accepting a further communication terminal instead of the communication terminal with detected blocking for using the removed resources and/or commanding redistributing the unused power to other communication terminals.

24. The method according to claim 13, further comprising:
automatically setting a number of channel coding elements per transmission time interval for transmitting control information to a communication terminal lower than the evaluated required number of channel coding elements per transmission time interval;
sending a command to increase transmission power for the transmission of control information to the communication terminal; and
taking the lower number of channel coding elements per transmission time interval for transmitting control information with increased transmission power to the communication terminal as the number of channel coding elements per transmission time interval required to transmit control information to the communication terminal.

25. A non-transitory computer program product comprising
computer-executable components which perform, when the program is run on a computer:
evaluating a number of channel coding elements per transmission time interval required to transmit control information to a communication terminal based on communication connection condition information with respect to the communication terminal, wherein the control information is defined by information on the scheduling of communication resources allocation to the communication terminal;
determining a modified capacity, wherein a capacity is defined by a total of available channel coding elements per transmission time interval on a channel dedicated for transmitting the control information; and
selecting a quantity of communication terminals for being provided with control information on the channel dedicated for transmitting the control information by accepting a further communication terminal to the quantity if the total sum of channel coding elements per transmission time interval required to transmit control information to each communication terminal of the quantity including the further communication terminal does not exceed the modified capacity, and by otherwise rejecting the further communication terminal.

26. The computer program product according to claim 25, embodied as a non-transitory computer-readable storage medium.

* * * * *